(12) United States Patent
Anstadt

(10) Patent No.: US 12,478,773 B2
(45) Date of Patent: Nov. 25, 2025

(54) DYNAMIC DRIVE SYSTEM FOR CARDIAC SYSTOLIC AND DIASTOLIC ASSIST

(71) Applicant: Lifebridge Technologies, LLC, Dayton, OH (US)

(72) Inventor: Mark P. Anstadt, Kettering, OH (US)

(73) Assignee: Lifebridge Technologies LLC, Dayton, OH (US)

( * ) Notice: Subject to any disclaimer, the term of this patent is extended or adjusted under 35 U.S.C. 154(b) by 0 days.

(21) Appl. No.: 18/586,464

(22) Filed: Feb. 24, 2024

(65) Prior Publication Data

US 2024/0198079 A1    Jun. 20, 2024

Related U.S. Application Data

(63) Continuation-in-part of application No. 18/393,661, filed on Dec. 21, 2023, and a continuation-in-part of
(Continued)

(51) Int. Cl.
*A61M 60/191* (2021.01)
*A61M 39/22* (2006.01)
(Continued)

(52) U.S. Cl.
CPC .......... *A61M 60/191* (2021.01); *A61M 39/22* (2013.01); *A61M 60/289* (2021.01);
(Continued)

(58) Field of Classification Search
CPC .............. A61M 60/191; A61M 60/289; A61M 60/247; A61M 60/205; A61M 60/531; A61M 39/22; A61M 2205/3331
See application file for complete search history.

(56) References Cited

U.S. PATENT DOCUMENTS 2,826,193 A    3/1958    Vineberg
2,889,780 A    6/1959    Binford
(Continued)

FOREIGN PATENT DOCUMENTS

WO    WO 00/78375    12/2000
WO    WO2005/091860    10/2005
WO    WO2006/122036    11/2006

OTHER PUBLICATIONS

Song, Ruoyu et al. (2019). Causes of Desktop FDM Fabrication Failures in an Open Studio Environment. Procedia CIRP. 80. 494-499. (Year: 2019).

*Primary Examiner* — Pamela M. Bays
(74) *Attorney, Agent, or Firm* — LaMorte & Associates P.C.

(57) ABSTRACT

A system and method for assisting a heart in pumping blood, wherein the heart has external force requirements that need to be externally applied to the heart using a cardiac assist device that is powered by a drive fluid. The cardiac assist device is powered by a drive fluid having a pressure/flow profile that is customized to the needs of the heart. The pressure/flow profile is generated by a displacement pump. If the pressure/flow profile requires pressures that cannot be made by the displacement pump, then the pressure/flow profile can be altered by venting pressure and/or adding pressurized fluid into the system. In this manner, a precise pressure/flow profile can be produced that meets the exact needs of a heart being acted upon by a cardiac assist device.

7 Claims, 5 Drawing Sheets

Related U.S. Application Data application No. 18/530,157, filed on Dec. 5, 2023, which is a continuation-in-part of application No. 18/509,260, filed on Nov. 14, 2023, said application No. 18/393,661 is a continuation-in-part of application No. 18/509,260, filed on Nov. 14, 2023, said application No. 18/530,157 is a continuation-in-part of application No. 18/447,786, filed on Aug. 10, 2023, now Pat. No. 12,115,363, said application No. 18/509,260 is a continuation-in-part of application No. 18/447,786, filed on Aug. 10, 2023, now Pat. No. 12,115,363, application No. 18/586,464 is a continuation-in-part of application No. 18/447,786, filed on Aug. 10, 2023, now Pat. No. 12,115,363, said application No. 18/530,157 is a continuation-in-part of application No. 18/160,963, filed on Jan. 27, 2023, now Pat. No. 11,896,812, said application No. 18/509,260 is a continuation-in-part of application No. 18/160,963, filed on Jan. 27, 2023, now Pat. No. 11,896,812, application No. 18/586,464 is a continuation-in-part of application No. 18/150,746, filed on Jan. 5, 2023, now Pat. No. 12,263,332, which is a continuation-in-part of application No. 17/931,853, filed on Sep. 13, 2022, said application No. 18/509,260 is a continuation-in-part of application No. 17/825,343, filed on May 26, 2022, which is a continuation-in-part of application No. 17/208,776, filed on Mar. 22, 2021, now Pat. No. 11,383,076.

(60) Provisional application No. 63/086,478, filed on Oct. 1, 2020.

(51) Int. Cl.
*A61M 60/289* (2021.01)
*A61M 60/205* (2021.01)
*A61M 60/247* (2021.01)
*A61M 60/531* (2021.01)

(52) U.S. Cl.
CPC ......... *A61M 60/205* (2021.01); *A61M 60/247* (2021.01); *A61M 60/531* (2021.01); *A61M 2205/10* (2013.01); *A61M 2205/3331* (2013.01)

(56) References Cited

U.S. PATENT DOCUMENTS

| | | |
|---|---|---|
| 3,053,249 A | 9/1962 | Smith |
| 3,233,607 A | 2/1966 | Bolie |
| 3,279,464 A | 10/1966 | Kline |
| 3,304,501 A | 2/1967 | Ruthenberg |
| 3,371,662 A | 3/1968 | Heid |
| 3,376,863 A | 4/1968 | Kolobow |
| 3,449,767 A | 6/1969 | Bolie |
| 3,455,298 A | 7/1969 | Anstadt |
| 3,478,737 A | 11/1969 | Rassman |
| 3,513,836 A | 5/1970 | Sausse |
| 3,587,567 A | 6/1971 | Schiff |
| 3,590,815 A | 7/1971 | Schiff |
| 3,613,672 A | 10/1971 | Schiff |
| 3,674,381 A | 7/1972 | Schiff |
| 4,048,990 A | 9/1977 | Goetz |
| 4,192,293 A | 3/1980 | Asrican |
| 4,281,669 A | 8/1981 | MacGregor |
| 4,448,190 A | 5/1984 | Freeman |
| 4,536,893 A | 8/1985 | Parravicini |
| 4,609,176 A | 9/1986 | Powers |
| 4,621,617 A | 11/1986 | Sharma |
| 4,662,358 A | 5/1987 | Farrar |
| 4,684,143 A | 8/1987 | Sata |
| 4,957,477 A | 9/1990 | Lundback |
| 4,979,936 A | 12/1990 | Stephenson |
| 5,066,111 A | 11/1991 | Inokuchi |
| 5,089,017 A | 2/1992 | Young |
| 5,098,369 A | 3/1992 | Heilman et al. |
| 5,098,442 A | 3/1992 | Grandjean |
| 5,119,804 A | 6/1992 | Anstadt |
| 5,131,905 A | 7/1992 | Grooters |
| 5,156,154 A | 10/1992 | Valenta, Jr. et al. |
| 5,158,978 A | 10/1992 | Rubin |
| 5,169,381 A | 12/1992 | Snyders |
| 5,199,804 A | 4/1993 | Rimbey et al. |
| 5,205,722 A | 4/1993 | Hammond |
| 5,256,132 A | 10/1993 | Snyders |
| 5,273,518 A | 12/1993 | Lee et al. |
| 5,322,067 A | 6/1994 | Prater |
| 5,330,505 A | 7/1994 | Cohen |
| 5,364,337 A | 11/1994 | Guiraudon et al. |
| 5,368,451 A | 11/1994 | Hammond |
| 5,374,287 A | 12/1994 | Rubin |
| 5,383,840 A | 1/1995 | Heilman et al. |
| 5,385,528 A | 1/1995 | Wilk |
| 5,429,584 A | 7/1995 | Chiu |
| 5,476,502 A | 12/1995 | Rubin |
| 5,496,353 A | 3/1996 | Grandjean et al. |
| 5,533,958 A | 7/1996 | Wilk |
| 5,558,617 A | 9/1996 | Heilman et al. |
| 5,562,595 A | 10/1996 | Neisz |
| 5,658,237 A | 8/1997 | Francischelli |
| 5,674,259 A | 10/1997 | Gray |
| 5,697,884 A | 12/1997 | Francischelli et al. |
| 5,697,952 A | 12/1997 | Francischelli et al. |
| 5,707,336 A | 1/1998 | Rubin |
| 5,713,954 A | 2/1998 | Rosenberg et al. |
| 5,716,379 A | 2/1998 | Bourgeios et al. |
| 5,738,627 A | 4/1998 | Kovacs et al. |
| 5,749,839 A | 5/1998 | Kovacs |
| 5,769,800 A | 6/1998 | Gelfand et al. |
| 5,800,334 A | 9/1998 | Wilk |
| 5,861,558 A | 1/1999 | Buhl et al. |
| 5,876,345 A | 3/1999 | Eaton et al. |
| 5,902,229 A | 5/1999 | Tsitlik et al. |
| 5,908,378 A | 6/1999 | Kovacs et al. |
| 5,910,124 A | 6/1999 | Rubin |
| 5,919,209 A | 7/1999 | Schouten |
| 5,971,910 A | 10/1999 | Tsitlik et al. |
| 5,971,911 A | 10/1999 | WVilk |
| 5,980,571 A | 11/1999 | Nomura et al. |
| 6,042,532 A | 3/2000 | Freed et al. |
| 6,044,298 A | 3/2000 | Salo et al. |
| 6,059,750 A | 5/2000 | Fogarty et al. |
| 6,076,013 A | 6/2000 | Brennan et al. |
| 6,095,968 A | 8/2000 | Snyders |
| 6,110,098 A | 8/2000 | Renirie et al. |
| 6,123,726 A | 9/2000 | Mori et al. |
| 6,132,363 A | 10/2000 | Freed et al. |
| 6,183,412 B1 | 2/2001 | Benkowski et al. |
| 6,206,820 B1 | 3/2001 | Kazi et al. |
| 6,224,540 B1 | 5/2001 | Lederman |
| 6,238,334 B1 | 5/2001 | Easterbrook, III et al. |
| 6,251,061 B1 | 6/2001 | Hastings et al. |
| 6,254,525 B1 | 7/2001 | Reinhardt et al. |
| 6,282,445 B1 | 8/2001 | Reinhardt et al. |
| 6,298,266 B1 | 10/2001 | Rubin et al. |
| 6,309,380 B1 | 10/2001 | Larson et al. |
| 6,328,689 B1 | 12/2001 | Gonzalez et al. |
| 6,408,205 B1 | 6/2002 | Renirie et al. |
| 6,432,039 B1 | 8/2002 | Wardle |
| 6,438,411 B1 | 8/2002 | Guttman et al. |
| 6,464,655 B1 | 10/2002 | Shahinpoor |
| 6,485,407 B2 | 11/2002 | Alferness et al. |
| 6,508,756 B1 | 1/2003 | Kung et al. |
| 6,540,659 B1 | 4/2003 | Milbocker |
| 6,547,716 B1 | 4/2003 | Milbocker |
| 6,572,534 B1 | 6/2003 | Milbocker et al. |
| 6,602,182 B1 | 8/2003 | Milbocker |
| 6,612,978 B2 | 9/2003 | Lau et al. |
| 6,616,596 B1 | 9/2003 | Milbocker |
| 6,622,045 B2 | 9/2003 | Snell et al. |

(56) References Cited

U.S. PATENT DOCUMENTS

| | | |
|---|---|---|
| 6,626,821 B1 | 9/2003 | Kung et al. |
| 6,641,604 B1 | 11/2003 | Adelman et al. |
| 6,682,474 B2 | 1/2004 | Lau et al. |
| 6,730,016 B1 | 5/2004 | Cox et al. |
| 6,757,561 B2 | 6/2004 | Rubin et al. |
| 6,808,483 B1 | 10/2004 | Ortiz et al. |
| 6,846,296 B1 | 1/2005 | Milbocker et al. |
| 6,971,127 B2 | 12/2005 | Richards |
| 7,331,221 B2 | 2/2008 | Wise et al. |
| 7,494,459 B2 | 2/2009 | Anstadt et al. |
| 7,871,366 B2 | 1/2011 | Criscione et al. |
| 8,187,160 B2 | 5/2012 | Criscione et al. |
| 8,460,181 B2 | 6/2013 | Saadat et al. |
| 10,463,496 B2 | 11/2019 | Criscione et al. |
| 11,191,944 B2 | 12/2021 | Tuval et al. |
| 11,511,102 B2 | 11/2022 | Criscione et al. |
| 12,115,363 B1 | 10/2024 | Anstadt |
| 12,161,857 B2 | 12/2024 | Saul et al. |
| 2001/0002445 A1 | 5/2001 | Vesely |
| 2001/0041821 A1 | 11/2001 | Wilk |
| 2002/0173693 A1 | 11/2002 | Landesberg |
| 2003/0032855 A1 | 2/2003 | Shahinpoor |
| 2004/0010180 A1 | 1/2004 | Scorvo |
| 2004/0024315 A1 | 2/2004 | Chalana |
| 2004/0059183 A1 | 3/2004 | Jozef et al. |
| 2004/0078067 A1 | 4/2004 | Thompson et al. |
| 2004/0102674 A1 | 5/2004 | Zadini et al. |
| 2004/0116769 A1 | 6/2004 | Jassawalla |
| 2004/0167375 A1 | 8/2004 | Couvillon |
| 2004/0225177 A1 | 11/2004 | Coleman et al. |
| 2004/0267086 A1 | 12/2004 | Anstadt et al. |
| 2005/0113632 A1 | 5/2005 | Ortiz et al. |
| 2005/0148814 A1 | 7/2005 | Fischi et al. |
| 2005/0234289 A1 | 10/2005 | Anstadt et al. |
| 2006/0106442 A1 | 5/2006 | Richardson |
| 2006/0129025 A1 | 6/2006 | Levine et al. |
| 2006/0142634 A1 | 6/2006 | Anstadt et al. |
| 2006/0167334 A1* | 7/2006 | Anstadt ............... A61M 60/191 600/17 |
| 2006/0211909 A1 | 9/2006 | Anstadt et al. |
| 2007/0197859 A1 | 8/2007 | Schaer et al. |
| 2008/0255629 A1 | 10/2008 | Jenson |
| 2008/0257412 A1 | 10/2008 | Gordon |
| 2009/0036730 A1 | 2/2009 | Criscione |
| 2009/0099498 A1* | 4/2009 | Demers ............ A61M 1/36225 604/4.01 |
| 2010/0081867 A1 | 4/2010 | Fishler |
| 2010/0152523 A1 | 6/2010 | MacDonald et al. |
| 2010/0191071 A1 | 7/2010 | Anderson |
| 2011/0196189 A1 | 8/2011 | Milbocker |
| 2012/0095498 A1 | 4/2012 | Stefanchik et al. |
| 2013/0102849 A1 | 4/2013 | Criscione |
| 2015/0018607 A1 | 1/2015 | Akita |
| 2015/0080640 A1 | 3/2015 | Lillehei |
| 2016/0101230 A1 | 4/2016 | Ochsner |
| 2016/0151552 A1 | 6/2016 | Solem |
| 2016/0262889 A1 | 9/2016 | Laham |
| 2016/0346449 A1 | 12/2016 | Roche |
| 2017/0258593 A1 | 9/2017 | Good et al. |
| 2018/0153709 A1 | 6/2018 | Hunter |
| 2019/0224395 A1 | 7/2019 | Pilla et al. |
| 2020/0085579 A1 | 3/2020 | Kim |
| 2022/0013211 A1 | 1/2022 | Steinberg |
| 2022/0249830 A1 | 8/2022 | Kanz |
| 2023/0060284 A1 | 3/2023 | Siess et al. |
| 2023/0071248 A1 | 3/2023 | Keenan et al. |
| 2024/0216652 A1 | 7/2024 | Keenan et al. |
| 2024/0269459 A1 | 8/2024 | Schellenberg et al. |

* cited by examiner

DYNAMIC DRIVE SYSTEM FOR CARDIAC SYSTOLIC AND DIASTOLIC ASSIST

RELATED APPLICATIONS

This application is a continuation-in-part of U.S. patent application Ser. No. 18/447,786 filed Aug. 10, 2023, now U.S. Pat. No. 12,115,363.

This application is also a continuation-in-part of U.S. patent application Ser. No. 18/393,661 filed Dec. 21, 2023, which is a continuation-in-part of co-pending U.S. patent application Ser. No. 18/509,260 filed Nov. 14, 2023, which is a continuation-in-part of co-pending U.S. application Ser. No. 17/825,343 filed May 26, 2022, which is a continuation-in-part of U.S. application Ser. No. 17/208,776 filed Mar. 22, 2021, now U.S. Pat. No. 11,383,076, which claimed the benefit of U.S. Provisional Application No. 63/086,478 filed Oct. 1, 2020. U.S. patent application Ser. No. 18/509,260 is a further continuation-in-part of Ser. No. 18/150,746 filed on Jan. 5, 2023, now U.S. Pat. No. 12,263,332, which is a continuation-in-part of U.S. patent application Ser. No. 17/931,853 filed on Sep. 13, 2022. U.S. patent application Ser. No. 18/509,260 is a further continuation-in-part of Ser. No. 18/160,963 filed on Jan. 27, 2023 now U.S. Pat. No. 11,896,812. U.S. patent application Ser. No. 18/509,260 is a further continuation-in-part of Ser. No. 18/447,786 filed on Aug. 10, 2023.

This application is a further continuation-in-part of U.S. patent application Ser. No. 18/150,746, filed Jan. 5, 2023, now U.S. Pat. No. 12,263,332, which is a continuation-in-part of U.S. application Ser. No. 17/931,853 filed Sep. 13, 2022.

This application is a further continuation-in-part of U.S. patent application Ser. No. 18/530,157, filed Dec. 5, 2023, which is a continuation-in-part of said U.S. application Ser. No. 18/447,786, (now U.S. Pat. No. 12,115,363), a continuation-in-part of said U.S. application Ser. No. 18/509,260 and a continuation-in-part of said U.S. application Ser. No. 18/160,963.

BACKGROUND OF THE INVENTION

1. Field of the Invention

In general, the present invention relates to cardiac assist systems that apply forces to the exterior of the heart in vivo to assist the heart in pumping blood. More particularly, the present invention relates to drive systems used to provide pneumatic or hydraulic power to a direct cardiac compression device being utilized by the cardiac assist system.

2. Prior Art Description

There are medical circumstances in which it is beneficial to attach a direct cardiac compression device to the exterior of an injured, failing, or arrested heart. The direct cardiac compression device supplements the pumping action of the heart by imparting forces directly onto the exterior of the heart in an effort to artificially maintain the physiological function of the heart. Most prior art direct cardiac compression devices mechanically compress the heart to aid systolic pump function. The power used to operate the direct cardiac compression device is typically pneumatic or hydraulic in nature. As is explained below, the present invention is for a drive that aids in both systolic (compression) and/or mechanical expansion of the heart to aid in diastolic pump function.

The heart is a complex organ. When the heart pumps, various muscle tissue within the heart contracts in a very specific pattern. In order for a cardiac assist system to properly assist the heart in pumping, the direct cardiac compression device must apply forces to the heart throughout the heart pumping cycle. As such, the direct cardiac compression device must help the heart both contract and expand in a time period of less than one second. Furthermore, the direct cardiac compression device must apply forces to the heart that takes into account the heart's own inherent natural pumping rhythm. In this manner, the direct cardiac compression device can help the heart pump operate in better synchrony to its natural rhythm, which can be highly beneficial to the recovery. However, when the heart's rhythm is erratic and the heart is functioning very poorly, the natural rhythm becomes far less relevant. When an erratic or arrested heart is being assisted, forces are applied to the heart in a rhythmic pattern that follows an appropriate pumping profile that is dictated by the heart's size, the heart volume, and/or strain characteristics of the heart.

A cardiac assist system that uses a direct cardiac compression device to apply forces to the exterior of the heart requires a pump drive. The pump drive generates the pneumatic or hydraulic forces that power the direct cardiac compression device. The forces generated by the pump drive must alternate to generate cyclic positive and negative pressures during the heart's pumping cycle in order to optimally deliver the forces through the direct cardiac compression device with the appropriate pumping rhythm. These forces can actually stimulate contraction of the heart and/or the rhythmic cycling adjusted to be more in synchrony with the heart when the heart's native function is heathy enough to contribute to its pump function. Although pump drives do exist for driving direct cardiac compression devices, the proper control of these pump drives is highly complex. The pump drive must drive a cardiac assist system to promote ventricular emptying (i.e., systolic compression) and provide both ventricular filling and priming of ventricular diastole. Although both phases are equally important to effective ventricular support, diastolic assist and/or aiding in the heart's filling, is particularly important. Diastolic assist can be compromised by direct cardiac compression devices that mechanically compress the heart. The diastolic assist is most effective if the direct cardiac compression device maintains attachment to the surface of the heart during diastolic actuation. This provides for the ventricles to be expanded or pulled outward. If the drive pump alters the pressure in a cardiac assist device too rapidly or with too much force, the cardiac assist device can separate from the heart. This decreases the efficiency of the cardiac assist device and can significantly compromise its functionality.

When a direct cardiac compression device is placed around the heart, the inherent compression caused by the presence of the device may impair the filling of the heart. This further leads to the emptying of the heart being impaired to some degree as the heart is relatively underfilled. An additional challenge to providing proper powering of the heart's ventricular pump function is the variability of the heart's underlying function when such devices are used. The heart's pump function can vary from near full function to no function at all when the heart is essentially arrested. The direct cardiac compression device is responsible for providing all the power needed to properly translate pump function to the heart's ventricular pumping chambers. When the heart is not arrested, but lacks the ability to pump efficiently, there are an infinite number of variations in force that may need to be generated by the cardiac assist system. Therefore, a need exists for a pump drive that can alter the drive forces in a manner that increases the underlying heart function without interfering with the heart's native function. In other words, the force delivered by a drive pump must be able to be modified such that the direct cardiac compression device on the heart can have an appropriate degree of assist.

Additionally, as the heart regains function there are times when a direct cardiac compression device needs to be relatively "neutral" or non-obligatory on heart function so that the underlying function of the heart can be assessed appropriately before removing the device. This non-obligatory state of the drive system needs to be performed relatively independently with regard to systolic and diastolic ventricular pump support. This allows the systolic and diastolic function to be assessed independently. Additionally, this provides a means for adjusting the degree of support for either systolic or diastolic assist independently.

A need therefore exists for an improved pump drive for a cardiac assist system that can accurately meet the dynamic pressure/flow profile requirements of a direct cardiac compression device as forces are applied to cause the heart's pump function to improve and foster its recovery. A need also exists for an improved pump drive that can cause the force applied to the heart to become non-obligatory while still maintaining the operation and functionality of the pump that moves the drive fluid. A need also exists for an improved pump drive system that can control strain dynamics of the device acting on the heart to best translate such forces to the heart's surface. These needs are met by the present invention as described and claimed below.

SUMMARY OF THE INVENTION

The present invention is a system and method for assisting a heart in pumping blood, wherein the heart has external force requirements that need to be externally applied to the heart. The external force requirements are applied to the heart using a cardiac assist system with a direct cardiac compression device that is powered by a drive fluid. The device then transfers the dynamic strain characteristics of its construct to the heart.

The drive fluid has a pressure/flow profile that is customized to the needs of the heart. The pressure/flow profile is primarily generated by a displacement pump. A least one vent valve is provided to finely control the pressure/flow of the drive fluid created by the displacement pump. Furthermore, if the vent valve is vented to atmosphere, the pressure/flow of the drive fluid can be brought to atmospheric pressure while the displacement pump still operates in its pumping rhythm. If the pressure/flow profile includes a pressure/flow value or a pressure/flow rate change that cannot be made by the displacement pump, then the pressure/flow profile can be altered by selectively venting pressure from the system. In this manner, a precise pressure/flow profile can be produced that meets the exact needs of a heart being acted upon by the cardiac assist device.

The direct cardiac compression device may have a suction lead that is used to keep the direct cardiac compression device in contact with the heart and to remove any air or fluids that enter the interface between the direct cardiac device and the heart. The suction line can be monitored to detect any loss of suction. The operation of the displacement pump and/or one vent valve can be controlled to compensate for any changes in the pressure/flow profile that develop due to any detected loss of suction.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system and methodology can be embodied in many ways, only a few exemplary embodiments are illustrated. The exemplary embodiments are being shown for the purposes of explanation and description. The exemplary embodiments are selected in order to set forth some of the best modes contemplated for the invention. The illustrated embodiments, however, are merely exemplary and should not be considered a limitation when interpreting the scope of the appended claims.

Figure 1:
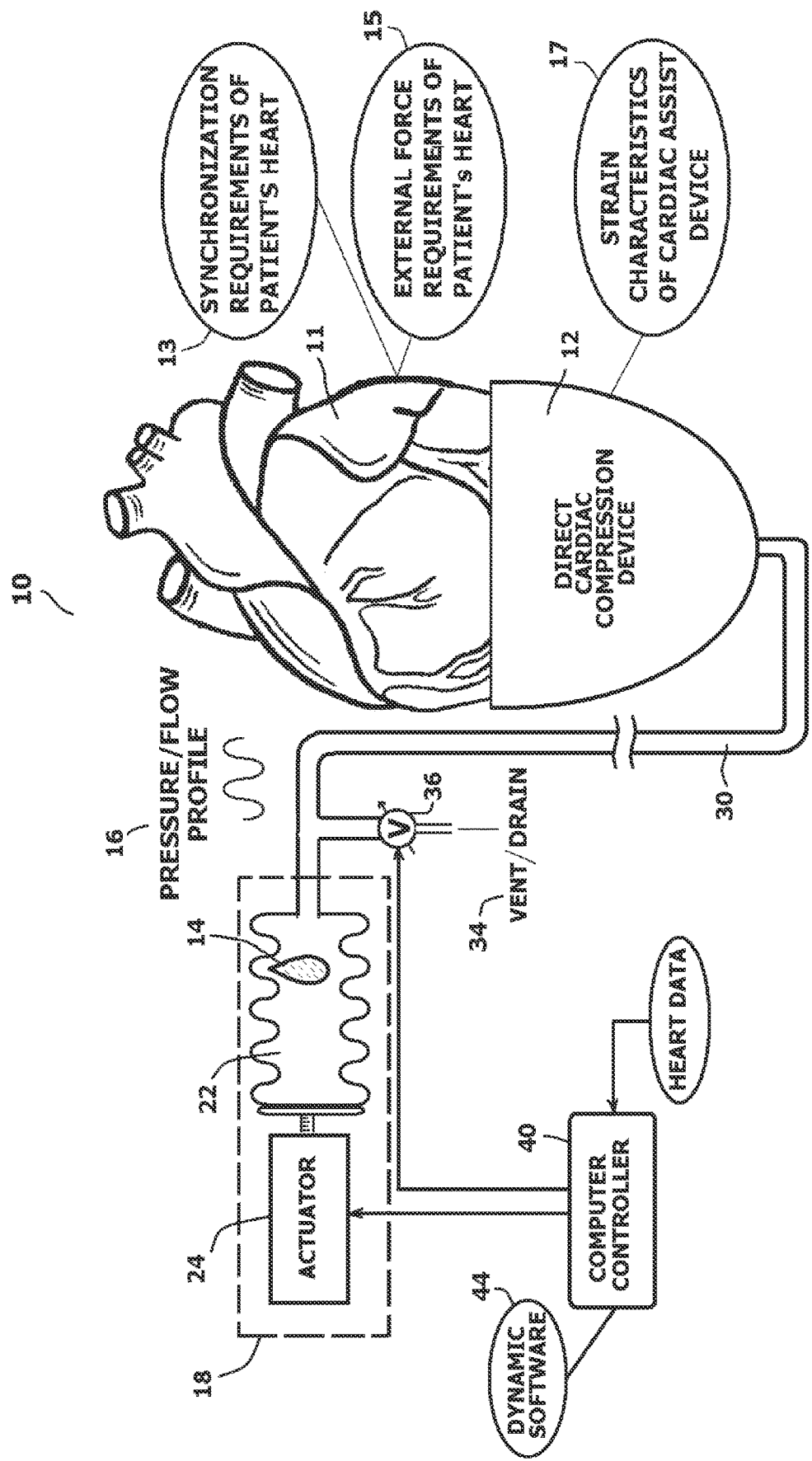
FIG. 1 is an exemplary schematic overview of the present invention cardiac assist system shown in conjunction with a heart.

Referring to FIG. 1, a cardiac assist system 10 is shown that uses a direct cardiac compression device 12 to apply external forces to a heart 11. The direct cardiac compression device 12 is used on a heart 11 that is injured, diseased and/or arrested. Although the heart 11 may be deficient in its ability to pump blood, the heart 11 may have a natural pumping rhythm. This can be determined by monitoring the heart 11 and/or reviewing previous scans of the heart 11. If the heart 11 is arrested and has no known history, the average rhythm for a heart of the size and patient type can be used. Accordingly, the heart 11 has synchronization requirements 13 that can be determined. The means to determine the synchronization requirements 13 are disclosed in U.S. Patent Application Publication No. 2022/0280771, the disclosure of which is incorporated into this application by reference.

The heart 11 is deficient or arrested in its pumping ability. As such, the heart 11 has external force requirements 15 that must be applied to the heart 11 during a pumping cycle in order for the heart 11 to pump blood to a degree sufficient to support life. The method for determining the external force requirements 15 of a particular heart are described in U.S. Pat. No. 11,383,067 and U.S. patent application Ser. No. 17/931,853, filed Sep. 13, 2022, the disclosures of which are incorporated into this application by reference.

In order to apply external forces to the heart 11, a direct cardiac compression device 12 is provided. The direct cardiac compression device 12 is customized to meet the needs of the heart 11. The direct cardiac compression device 12 contains elastomeric components that have various strain characteristics 17 that are designed to meet the external force requirements 15 of the heart 11. The manner of embodying specific strain characteristics 17 into a direct cardiac compression device, is disclosed in U.S. patent application Ser. No. 17/931,853 filed Sep. 13, 2022, and U.S. patent application Ser. No. 18/150,746 filed Jan. 5, 2023, the disclosures of which are incorporated into this application by reference.

The strain characteristics 17 embodied by the direct cardiac compression device 12 apply some inherent forces to the heart 11 by simply being in contact with the heart 11. If the direct cardiac compression device 12 is connected to a pneumatic or hydraulic drive that is turned off, the direct cardiac compression device 12 will be filled with a drive fluid 14 at ambient pressure. The mere presence of the drive fluid 14 in the direct cardiac compression device 12 will resist the expansion and/or contraction of the heart 11. In the present invention system 10, the inherent resistance of the direct cardiac compression device 12 is reduced to make the direct cardiac compression device 12 non-obligatory, as is later explained in more detail.

Although the direct cardiac compression device 12 applies some forces to the heart 11 that can be made non-obligatory, much greater forces are applied to the heart 11 when the direct cardiac compression device 12 is powered. The external forces applied by the direct cardiac compression device 12 must be carefully generated to meet the external force requirements 15 of the heart 11. This can only be accomplished by pneumatically or hydraulically powering the direct cardiac compression device 12 with the drive fluid 14. The pressure created in the drive fluid 14 varies with time throughout the pumping cycle of the heart 11. As such, the drive fluid 14 has a pressure/flow profile 16 that represents the pressure of the drive fluid 14 as it varies over the time (t) of a heart pumping cycle. The drive fluid 14 used to power the direct cardiac compression device 12 can be a gas, such as air or nitrogen, or a liquid, such as saline or distilled water. The pressure/flow profile 16 is created in the drive fluid 14 through the operation of a displacement pump 18.

The displacement pump 18 can either pressurizing the drive fluid 14 into the direct cardiac compression device 12 or draw the drive fluid 14 out of the direct cardiac compression device 12. The displacement pump 18 has a displacement chamber 22 that is filled with the drive fluid 14. The displacement chamber 22 can be a bellows, a piston chamber, or another such system with variable internal volume. The drive fluid 14 is either forced out of the displacement chamber 22 or drawn into the displacement chamber 22 by decreasing or increasing the internal volume of the displacement chamber 22. The decrease or increase in volume is controlled by a linear actuator 24, stepper motor, or other such mechanism that alters the internal volume of the displacement chamber 22.

Normally, the displacement pump 18 operates in a closed loop, wherein the volume of the drive fluid 14 in the cardiac assist system 10 remains constant during both the expansion and contraction of the heart 11. However, when needed, the cardiac drive system 10 can be changed to an open loop system, where the volume of the drive fluid 14 can be selectively varied. The displacement pump 18 is connected to the direct cardiac compression device 12 with a primary tube 30. The primary tube 30 can be connected to a vent/drain 34 at atmospheric pressure. Flow between the primary tube 30 and the vent/drain 34 is controlled by at least one variable valve 36. The valve 36 preferably has a variable flow rate that can be controlled by a computer controller 40. When the variable valve 36 is open, the pressure in the primary tube 30 moves toward ambient at a very rapid rate. The rate at which the pressure can change can be greater than that achievable by the displacement pump 18 alone. As such, the computer controller 40 can control the displacement pump 18 and simultaneously open/close the valve 36 to achieve pressure change rates in the pressure/flow profile 16 that may be required by the direct cardiac compression device 12, but are unachievable by the displacement pump 18 alone.

If the variable valve 36 vents to atmospheric pressure, no forces are applied to the heart 11 other than those inherent in the presence of the direct cardiac compression device 12. Furthermore, if the valve 36 is left open, the direct cardiac compression device 12 will not pneumatically or hydraulically resist the expansions and/or contractions of the heart 11. The resulting state is considered to be non-obligatory and can be useful when applying the direct cardiac compression device 12, removing the direct cardiac compression device 12, and/or testing the inherent strength of the heart 11 during a procedure.

Figure 2:
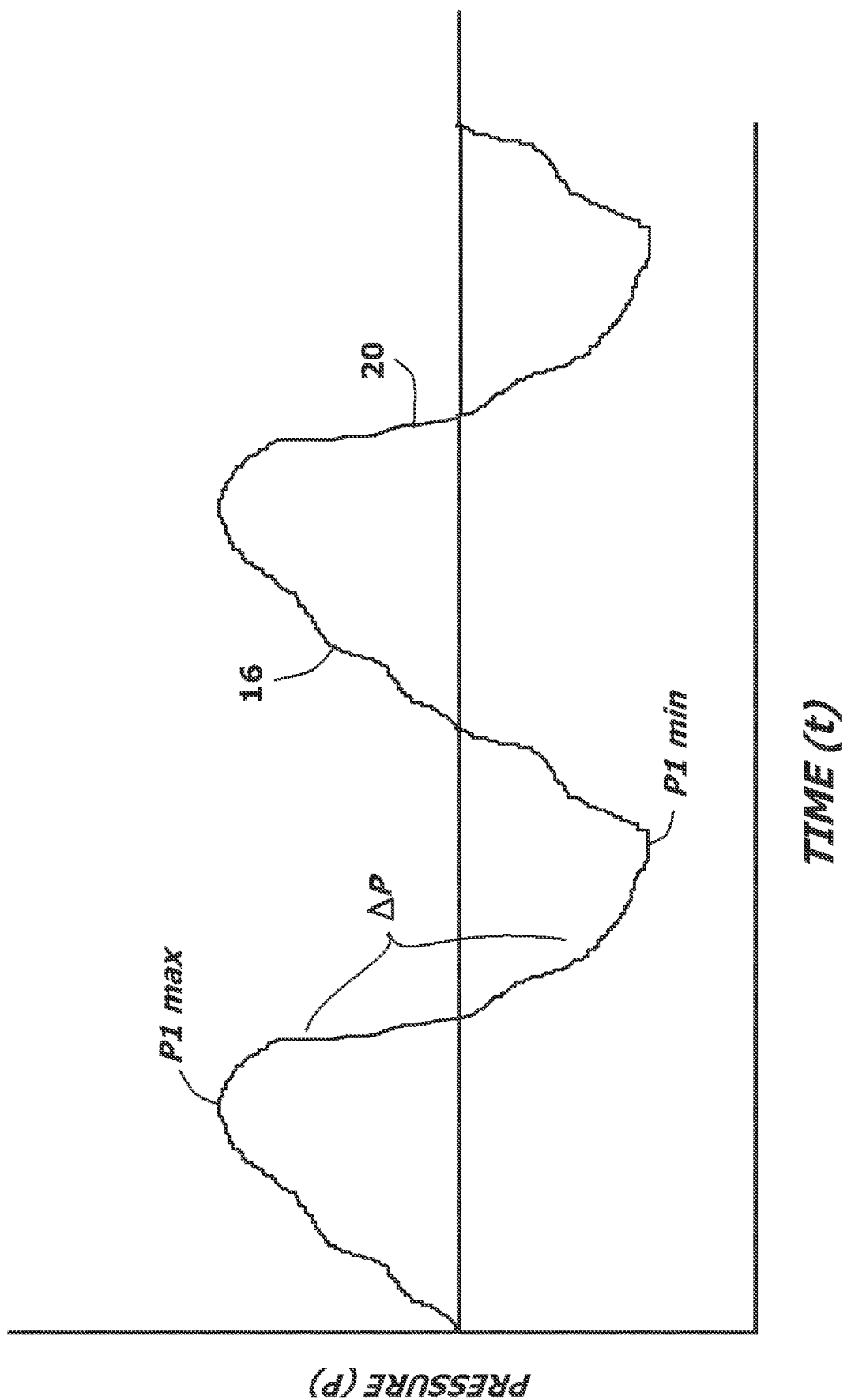
FIG. 2 shows an example of a pressure/flow profile that may be required by a cardiac assist device.

Referring to FIG. 2 in conjunction with FIG. 1, an example of a pressure/flow profile 16 is shown. The pressure/flow profile 16 shows the changes in the pressure of the drive fluid 14 over time. These pressure changes are required by the direct cardiac compression device 12 to meet the external force requirements 15 and synchronization requirements 13 of the heart 11. The pressure/flow profile 16 calculated for a particular heart 11 can be indexed to various heart measures that include entire heart volume, ventricular muscle mass, ventricular volumes, the size of the heart, the thickness of the heart muscle, the degree of damage/disease effecting the heart and/or the location of such damage/disease on the heart.

As can be seen, the pressure/flow profile 16 contains a maximum pressure ($P1_{max}$), a minimum pressure ($P1_{min}$) and complex transition zones 20 therebetween. In the transition zones 20, the slope of the pressure/flow profile 16 represents the change in pressure over time ($\Delta P$).

Figure 3:
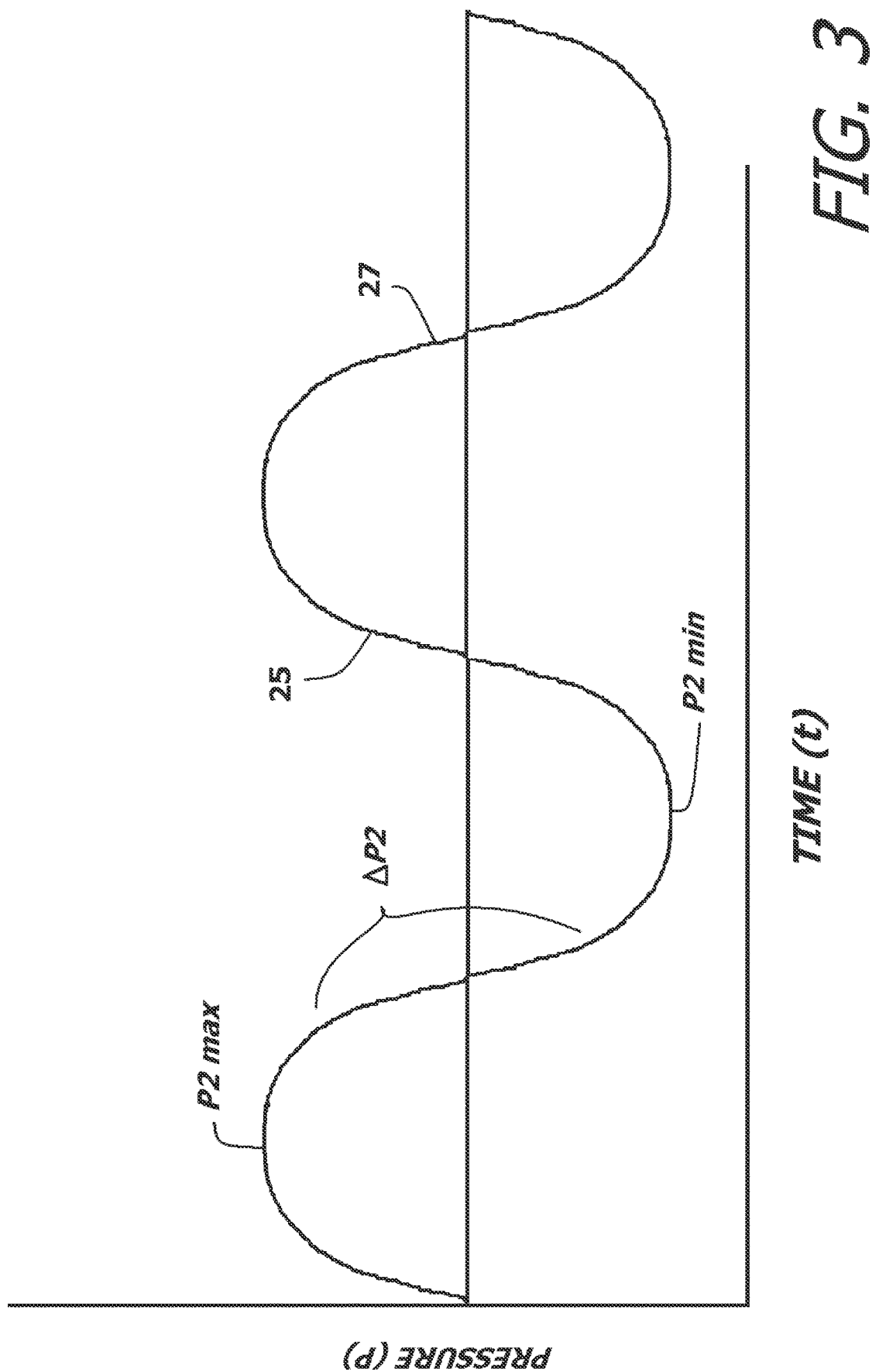
FIG. 3 shows an example of the pressure/flow profile that can be produced by the displacement pump alone.

Referring to FIG. 3, in conjunction with FIG. 1 and FIG. 2, it can be seen that the displacement pump 18 by itself can generate a complex pressure/flow profile 25 by expanding and contracting. The pressure/flow profile 25 of the displacement pump 18 has a maximum pressure ($P2_{max}$), a minimum pressure ($P2_{min}$), and a maximum pressure change rate ($\Delta P2$) that are all governed by the mechanics of the displacement pump 18. Comparing the needed pressure/flow profile 16 of FIG. 2 to the pressure/flow profile 25 of FIG. 3 being generated by the displacement pump, it can be seen that if the maximum pressure ($P2_{max}$) and the maximum pressure change rate ($\Delta P2$) in transition zones 27 are greater than or equal to those required by the pressure/flow profile 16 of the direct cardiac compression device 12, and the minimum pressure ($P2_{min}$) is less than that required, then the displacement pump 18 alone is capable of producing the pressure/flow profile 16 needed to properly drive the direct cardiac compression device 12. However, due to the complexity of some pressure/flow profiles that may be required, the displacement pump 18 may be insufficient to produce the nuances of the pressure/flow profile 16 and may require pressure change rate assistance that can be accomplished by selectively controlling the variable valve 36.

If the displacement pump 18 runs most efficiently if operated in a regular cyclic pattern. Using the basic cyclic pressure changes, the variable valve 36 can be operated to provide more emphasis on either systolic or diastolic support. For example, if the variable valve 36 is open to atmospheric pressure during the compression phase of the heart's pumping cycle, the direct cardiac compression device 12 will have little impact on compression. However, if the variable valve 36 is closed at the onset of diastole, full effect can be applied to the filling of the heart 11. The opposite happens when the variable valve 36 is closed during compression and open during diastole, wherein little if any impact is provided to the filling of the heart 11.

When the variable valve 36 is open during either compression or diastole, it creates a non-obligatory condition. The same effect would occur if the primary tube 30 were detached and left open to atmospheric pressure. The displacement pump 18 can be left running in a smooth cyclic fashion while the valve 36 is open to provide rather discrete times when the drive has a lesser effect on the heart 11.

Figure 4:
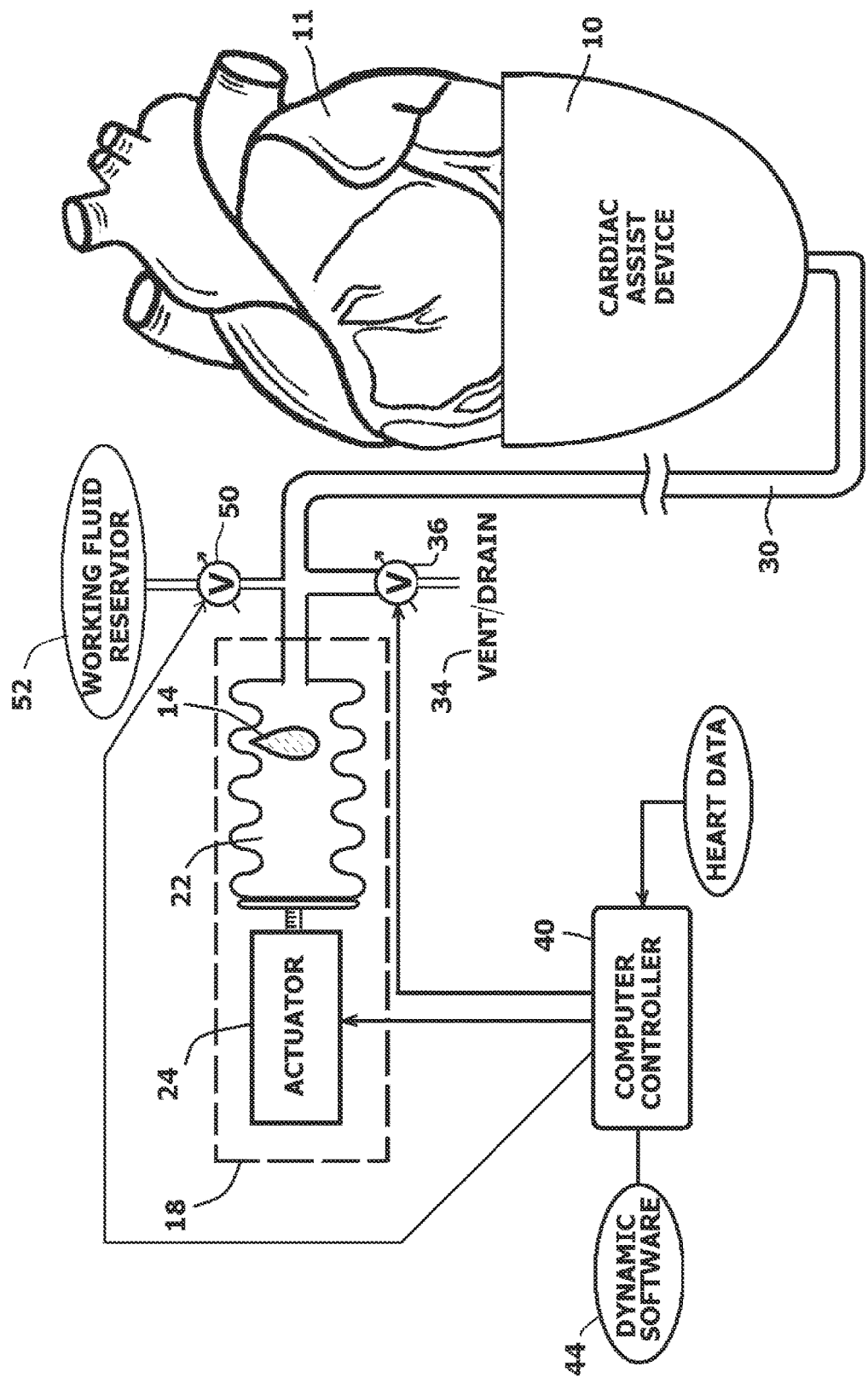
FIG. 4 shows a first optional modification to the cardiac assist system of FIG. 1.

Although the pressure/flow profile 16 can be selectively controlled by dynamically venting/draining the drive fluid 14, additional control can be obtained by selectively adding drive fluid 14 to the system under pressure. Referring to FIG. 4, a modification is shown where the displacement pump 18 is connected to the direct cardiac compression device 12 with a primary tube 30. The primary tube 30 can be connected to a reservoir 52 of working fluid. The flow between the primary tube 30 and the source of working fluid is controlled by at least one variable fill valve 50. The fill valve 50 preferably has a variable flow rate that can be controlled by a computer controller 40. When the fill valve 50 is open, the pressure in the source of working fluid can be increased at a very rapid rate. The rate at which the pressure rises can be greater than that achievable by the displacement pump 18 alone. As such, the computer controller 40 can control the displacement pump 18 and simultaneously open the fill valve 50 to achieve a pressure increase rate in the pressure/flow profile 16 that may be required by the direct cardiac compression device 12, but is unachievable by the displacement pump 18 alone.

The displacement pump 18, the fill valve 50, and the vent valve 36 are all operated by the computer controller 40. The computer controller 40 runs dynamic operational software 44 that selectively controls the displacement pump 18, the fill valve 50, and the vent valve 36 in order to generate the pressure/flow profile 16 to a high degree of accuracy.

Figure 5:
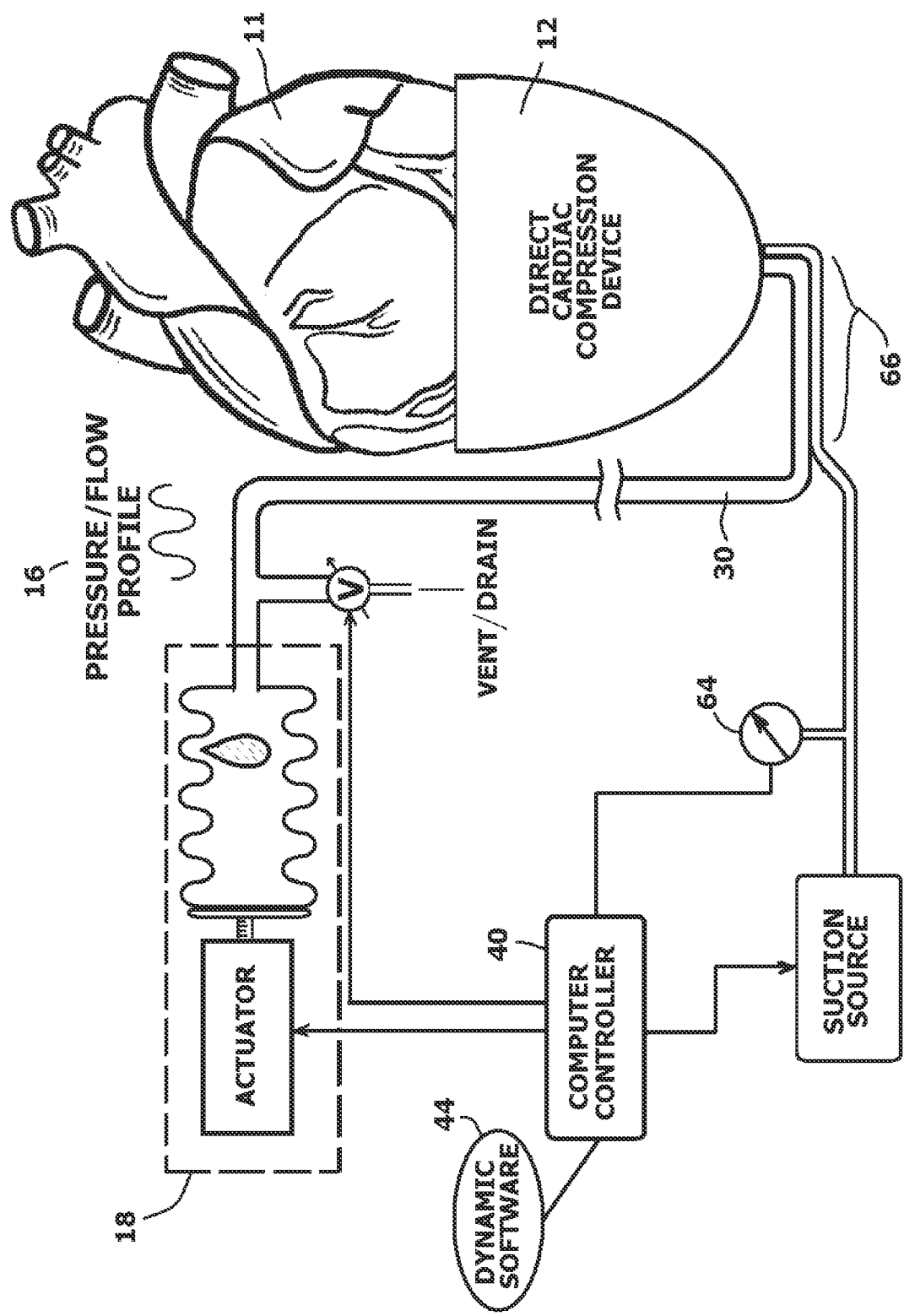
FIG. 5 shows a second optional modification to the cardiac assist system of FIG. 1.

The direct cardiac compression device 12 is a device that surrounds a portion or all of the ventricles of the heart 11. Therefore, during its application and operation, the direct cardiac compression device 12 is likely provided with a drain that is connected to a suction source. This drain would communicate with the space between the heart surface and the cuff of the device. Referring to FIG. 5, a modification is shown where a drain line 60 is connected to the direct cardiac compression device 12. The drain line 60 leads to a suction source 62. The drain line 60 is used to remove any air, blood, and/or fluids that may accumulate between the heart 11 and the direct cardiac compression device 12. The drain line 60 also maintains a negative pressure between the heart 11 and the direct cardiac compression device 12 to help prevent the direct cardiac compression device 12 from separating from the heart 11 while operating.

The negative pressure between the heart 11 and the direct cardiac compression device 12 is slight. However, the negative pressure does have an effect on the heart 11. As such, the presence of suction can alter the optimal pressure/flow profile 16 that is being produced by the displacement pump 18. If the suction is consistently maintained, then the effect on the pressure/flow profile 16 is constant and can be readily compensated for in the pressure/flow profile 16. However, the suction between the heart 11 and the direct cardiac compression device 12 is subject to breaking as the heart 11 and the direct cardiac compression device 12 move and air or fluid is drawn into the interface. When air or fluid breaks the suction between the heart 11 and the direct cardiac compression device 12, the heart 11 can rebound until suction is reestablished. This can cause a momentary hitch in the forces the heart 11 needs to pump efficiently.

In the embodiment of FIG. 5, a pressure monitor 64 is provided in the drain line 60. The pressure monitor 64 detects the pressure in the drain line 60 and detects when suction between the heart 11 and the direct cardiac compression device 12 is broken. The pressure monitor 64 can be connected to the computer controller 40. As such, the computer controller 40 can control or pause the displacement pump 18 to compensate for the effects caused by the momentary loss of pressure. There may be times when a seal is formed between the device 12 and the heart 11 and the drain is not needed.

As is indicated in FIG. 5, if the direct cardiac compression device 12 has both a drain line 60 and the primary tube 30 for delivering the pressure/flow profile, both tubes can be interconnected in a section 66 that extends into the body. In this manner, the tubes take less space and are less likely to tangle with each other and other surgical instruments that may be in use.

Referring to all figures, it will be understood that, in use, the pressure/flow profile 16 needed to be generated by the displacement pump 18 is determined by the dynamic application software 44. The software can consider the strain characteristics 13 of the direct cardiac compression device 12 in use, the external force requirements 15 of the heart 11, and secondary heart factors. The secondary heart factors include, but are not limited to, heart size, heart volume, extent of heart damage, heart wall thicknesses, heart valve deficiencies, and neurological deficiencies. Once the variables are input, the dynamic application software 44 calculates the required pressure/flow profile 16. With the pressure/flow profile 16 determined, the computer controller 40 operates the displacement pump 18 to generate the pressures that match the pressure/flow profile 16 at any time (t) during the pumping cycle of the heart 11.

The pressure/flow profile 16 required for each heart and each direct cardiac compression device 12 is different. If a pressure/flow profile 16 at some time (t) requires a lower pressure or a decreasing rate of pressure that is unobtainable from the displacement pump 18, then the computer controller 40 can activate the vent valve 36 and vent pressure. This increases the overall rate of change in pressure and enables the requirements of the pressure/flow profile 16 to be met while still using a simple displacement pump 18.

The computer controller 40 can also operate the vent valve 36 with/without the displacement pump 18 to make rapid adjustments to the pressure/flow profile 16 should suction be compromised or lost between the heart 11 and the direct cardiac compression device 12.

Likewise, if a pressure/flow profile 16 at some time (t) requires a non-obligatory condition to evaluate the natural strength of the heart, then the vent valve 36 can be left open to eliminate all pressure, while the displacement pump 18 is still pumping. The fully vented non-obligatory condition can also be maintained when the direct cardiac compression device 12 is being installed, removed or when the heart is being evaluated with other stimuli, such as a pacemaker.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A system for assisting a heart in pumping blood by applying customized external forces to the heart, said system comprising:
   a displacement pump that selectively moves a drive fluid;
   a direct cardiac compression device powered by said drive fluid, wherein said direct cardiac compression device produces said customized external forces when said drive fluid is provided to said direct cardiac compression device with a pressure/flow profile; and a tube that connects said displacement pump to said direct cardiac compression device, wherein said drive fluid flows through said tube;

a vent valve for selectively venting said tube;

a controller that selectively operates both said displacement pump and said vent valve to produce at least part of said pressure/flow profile in said drive fluid, wherein said vent valve selectively vents said tube to ambient pressure as said displacement pump continues to operate.

2. The system according to claim 1, wherein said vent valve has a variable venting rate.

3. The system according to claim 1, wherein said direct cardiac compression device has strain characteristics that combine with said pressure/flow profile to produce said customized external forces when said direct cardiac compression device is powered by said drive fluid.

4. The system according to claim 1, wherein said pressure/flow profile has a maximum pressure, a minimum pressure, and rates of pressure change between said maximum pressure and said minimum pressure.

5. The system according to claim 4, wherein operation of said vent valve can selectively alter said minimum pressure, and at least one of said rates of pressure change in said pressure/flow profile.

6. The system according to claim 1, further including a pressurized fluid source for selectively pressurizing said drive fluid to produce at least part of said pressure/flow profile in said drive fluid.

7. The system according to claim 1, further including a drain line that is utilized to alter said pressure/flow profile when pressure in said drain line changes.

* * * * *